Patented May 20, 1952

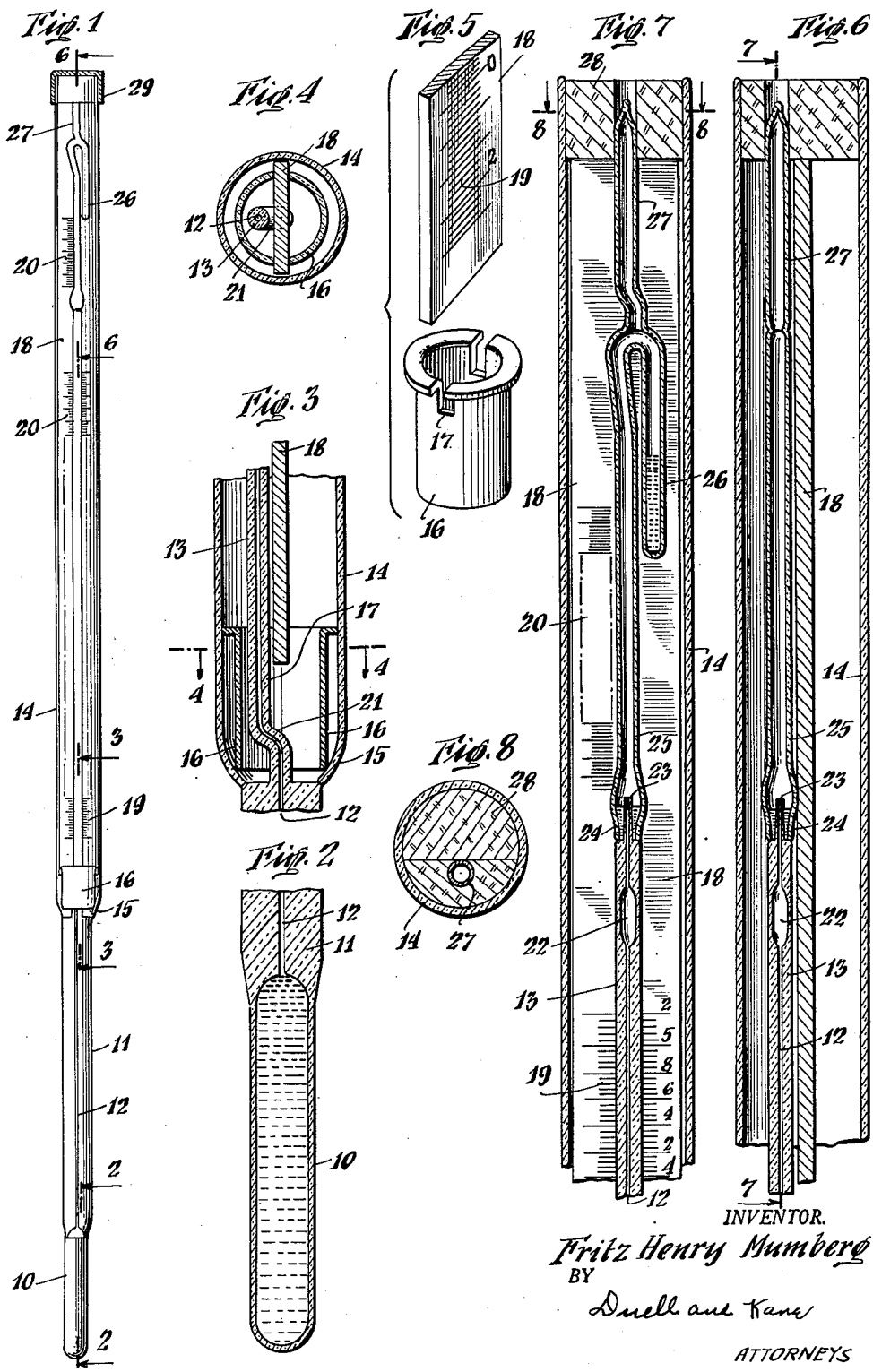

2,597,362

UNITED STATES PATENT OFFICE 2,597,362

THERMOMETER

Fritz Henry Mumberg, Philadelphia, Pa.

Application July 8, 1949, Serial No. 103,569

2 Claims. (Cl. 73—371)

This invention relates to a structurally and functionally improved thermometer and especially a differential type thermometer which may be used in laboratory research, educational institutions and industry to determine desired degrees of temperature such as boiling and freezing.

It is an object of the invention to furnish a differential thermometer which may be used with facility and without a special skill to accurately determine existing temperatures in, for example, a body of liquid and without having the temperature readings substantially affected by incidental vapors or otherwise.

A further object is that of furnishing a unit of this type in which the several parts may be properly correlated, or adjusted at the time of manufacture to provide a scientifically correct instrument capable of being used over long periods of time with freedom from all difficulties.

With these and other objects in mind, reference is had to the attached sheet of drawings illustrating one practical embodiment of the invention and in which:

Fig. 1 is a front view of a thermometer assembly embodying the present teachings;

Figs. 2 and 3 are fragmentary sectional side views taken respectively along the lines 2—2 and 3—3 and in the direction of the arrows as indicated in Fig. 1;

Fig. 4 is a transverse sectional view along the lines 4—4 and in the direction of the arrows as indicated in Fig. 3;

Fig. 5 is a fragmentary prospective view of a portion of the scale unit and also illustrating in similar prospectives the saddle member for mounting that scale;

Fig. 6 is a fragmentary enlarged sectional side view taken along the lines 6—6 and in the direction of the arrows as indicated in Fig. 1;

Fig. 7 is a view taken along the lines 7—7 and in the direction of the arrows as indicated in Fig. 6 and;

Fig. 8 is a sectional plan view taken along the lines 8—8 and in the direction of the arrows as indicated in Fig. 7.

In these views the reference numeral 10 indicates the bulb portion of the thermometer which contains mercury or else any other suitable liquid which may register the degree of heat to which the bulb is subjected. Extending above the bulb and as shown integral therewith is a solid stem portion 11. This portion may be of substantial length and be formed with a bore 12 providing a capillary duct.

This duct is continued in the form of an upwardly extending tube 13 above the solid stem portion 11. An encasing tube 14, preferably of transparent glass has its lower end conveniently reduced as indicated at 15 to be supported upon the stem portion 11. A saddle in the form of a metal cup 16, preferably bears against this inturned face 15 and is formed with a positioning notch 17 within which the lower base portion of a scale 18 rests. The latter is formed with graduations 19 extending throughout the major portion of its body and an upper or auxiliary series of graduations 20 which are disposed above the main zone of tube body 14.

It is preferred that the chart or scale member 18 be centrally disposed within the tube 14. To this end the lower portion of tube 17 is conveniently offset as indicated at 21 in Fig. 3. With such a construction while the chart member may be centrally disposed the tube 13 will lie closely adjacent to graduations 19 appearing upon that chart or scale member. Accordingly, readings may be easily taken. Also, by having the lower end of tube 14 preferably inturned it will be understood that at the time of manufacture by slightly modifying the curvature of the face 15 the saddle 16 and the scale may be shifted axially of the tube within limits so that proper adjustment of the parts is possible before they are finally disposed against movement with respect to each other.

Adjacent to its upper end the capillary duct 12 of tube 13 is enlarged as indicated at 22. Above this it is again diminished to substantially its regular cross sectional area as in Figs. 2 and 3. This duct terminates in an upwardly projection portion 23 which provides a reservoir 24 in conjunction with the lower base of an enlarged tube element 25. The latter rests upon the upper end of tube 13 and is connected against leakage with respect to the same. This tube body extends adjacent to the auxiliary scale 20.

At its upper end tube 25 is continued in the form of an inverted end or pocket portion 26 and also in the form of a tail or support portion 27. The latter conveniently extends into the bore of a plug 28 mounted by the upper end of the tube 14 formed with a bore to receive portion 27. A cap 29 preferably of metal may enclose the upper end of tube 14, as shown facing Fig. 1. It is apparent that plug 28 will not alone support tube 13 through the auxiliary portion adjacent its upper end, but will also bear against the upper edge of scale member 18. In so engaging this unit the latter will be maintained in position within the notch of the saddle 16 and will also be retained in proximity to tube 13 but slightly spaced from the latter should this be desired.

It is apparent with an apparatus, as described, that proper differential readings may be assured. These readings may be readily taken because the graduations instead of appearing on one of the faces of tube 14, will be carried by the chart member 18 which will be disposed immediately adjacent to the capillary duct 12 of tube 13. Also, by providing the solid stem portion 11 and the tube 14, substantially the only heat transmission affecting the reading will occur incident to the temperatures, to which the bulb may be subjected. In this connection, it will be understood that the solid stem will minimize the heat transfer to tube 13 and the same function will be achieved incident to the encasing tube 14 which will prevent vapors from flowing directly in contact with tube 13.

Mercury or other desired registering media may be transferred from the capillary duct 12 by conventional manipulation of the unit to assure the passage of the media into the reservoir 24. Again, by simple manipulation, the mercury or other material may be transferred from reservoir 24 to the portion 26. A return passage of the thus transferred or displaced material to the capillary duct 12 may be assured by the exercise of proper techniques to create pressure and positive displacement.

Thus, among others, the several objects of the invention and specifically as aforenoted are achieved. Obviously numerous changes in construction and rearrangement of the parts might be resorted to without departing from the spirit of the invention as defined by the claims.

I claim:

1. In a differential thermometer having a single continuous capillary tube made up of a relatively fine capillary section and a relatively wide capillary section and encased in an outer tube, the combination of a thick stem having a capillary passage through its center and supporting said capillary tube and said encasing tube, a joint between said stem and said encasing tube, a thin walled hollow cylindrical metal saddle removably positioned at the lower end of said encasing tube encircling said inner continuous tube and seated in the vicinity of said joint, a circumferential radial flange extending radially at the upper edge of said hollow cylindrical saddle abutting the inner wall surface of said outer encasing tube, diametric vertical slots extending downward at the upper edge of said hollow cylindrical saddle and a removable elongated thin chart member carrying a set of scale gradations for said wide capillary section and a separate set of scale gradations for said fine capillary section positioned and supported vertically in said vertical slots immediately adjacent said capillary tube substantially throughout the entire length thereof.

2. In a differential thermometer having a single continuous capillary glass tube made up of a relatively fine capillary section and a relatively wide capillary section and encased in an outer glass tube, the combination of a thick stem having a capillary passage through its center and supporting said capillary tube and said encasing tube, a joint between said stem and said encasing tube, an inwardly curved wall surface at the lower end of said encasing tube immediately adjacent said joint, a thin walled hollow cylindrical metal saddle removably seated on said inwardly curved surface of said encasing tube and encircling said inner continuous tube, a circumferential radial flange extending radially at the upper edge of said hollow cylindrical saddle abutting the inner wall surface of said outer encasing tube, diametric vertical slots extending downward at the upper edge of said hollow cylindrical saddle, a removable elongated thin chart member carrying a set of scale gradations for said wide capillary section and a separate set of scale gradations for said fine capillary section positioned and supported vertically in said vertical slots and immediately adjacent said single continuous tube substantially throughout its entire length, a bottom edge of said chart member extending across said hollow cylindrical saddle, and a bend in said capillary tube within said cylinder and below said lower edge of said chart member.

FRITZ HENRY MUMBERG.

REFERENCES CITED

The following references are of record in the file of this patent:

UNITED STATES PATENTS

| Number | Name | Date |
|---|---|---|
| 1,199,121 | Siebert | Sept. 26, 1916 |
| 2,320,753 | Schwartz | June 1, 1943 |

FOREIGN PATENTS

| Number | Country | Date |
|---|---|---|
| 485,995 | France | Feb. 26, 1918 |
| 695,831 | Germany | Sept. 4, 1930 |